Oct. 13, 1925.
F. THORNTON, JR
1,557,105
CONNECTING PLUG REMOVER
Filed Nov. 12, 1923
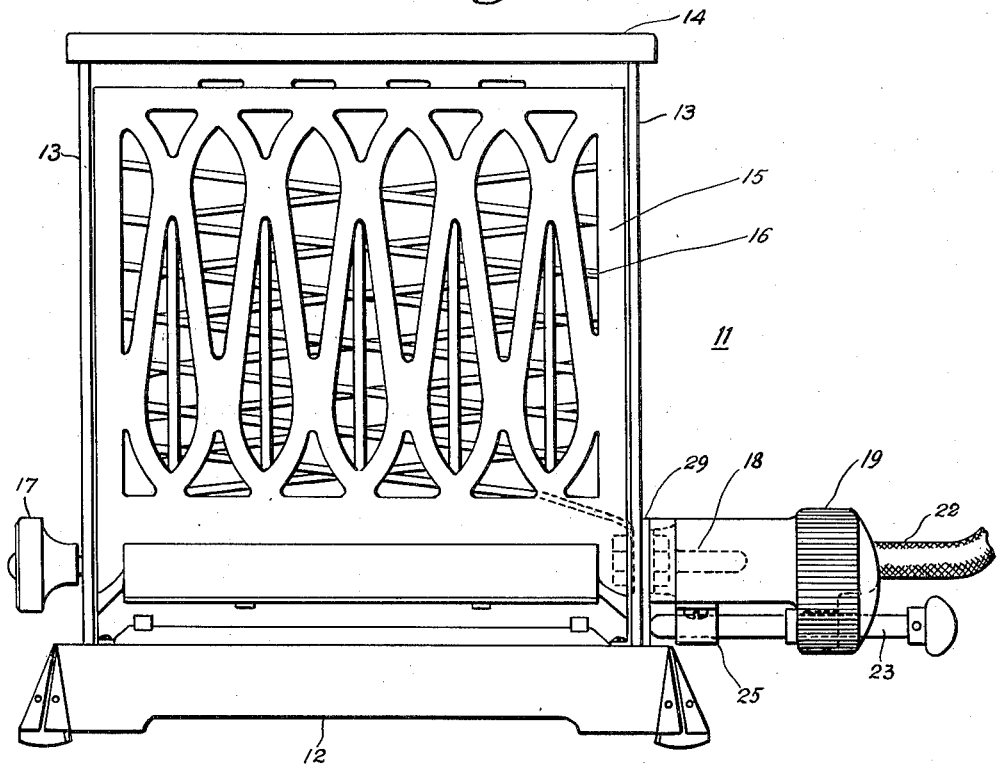
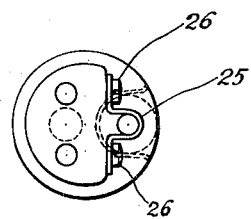
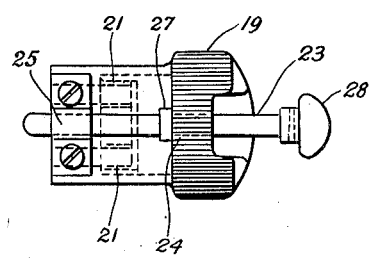
WITNESSES:
INVENTOR
Frank Thornton, Jr.
BY
ATTORNEY Patented Oct. 13, 1925.

1,557,105

UNITED STATES PATENT OFFICE.

FRANK THORNTON, JR., OF PITTSBURGH, PENNSYLVANIA, ASSIGNOR TO WESTINGHOUSE ELECTRIC & MANUFACTURING COMPANY, A CORPORATION OF PENNSYLVANIA.

CONNECTING-PLUG REMOVER.

Application filed November 12, 1923. Serial No. 674,162.

*To all whom it may concern:*

Be it known that I, FRANK THORNTON, Jr., a citizen of the United States, and a resident of Pittsburgh, in the county of Allegheny and State of Pennsylvania, have invented a new and useful Improvement in Connecting-Plug Removers, of which the following is a specification.

My invention relates to portable electrically heated apparatus and particularly to connecting plugs therefor.

The object of my invention is to provide a means for disengaging a connecting plug from the terminals of a portable electrically-heated appliance without tending to move the appliance relatively to a supporting surface.

In practicing my invention, I provide a connecting plug having movably mounted thereon a rod, one end of which may be pressed against a surface of the appliance by the hand of an operator to cause the plug to move relatively to and away from the terminal pins.

In the single sheet of drawings,

Figure 1 is a view, in side elevation, of an electrical appliance having associated therewith a connecting plug embodying my invention, Fig. 2 is a bottom plan view of a connecting plug embodying my invention, and Fig. 3 is a view in end elevation thereof.

Although the device embodying my invention may be associated with any one of a wide variety of portable electrically heated appliances, particularly those used for cooking or otherwise preparing foods, I have illustrated its use in connection with a toaster 11 that comprises a base 12, side frame members 13 and a top member 14. A tray 15 is provided on each side of a heating element 16, the tray being manually adjustable away from and toward the heating element by knobs 17, pivotally mounted in the side frames 13. A plurality of terminal pins 18 are insulatedly mounted in one of the side frames 13 and have the ends of the resistor member of the heating element 16 operatively connected thereto.

A connecting plug 19 that may be of any suitable or desired type of construction, has mounted therein a plurality of spaced sockets 21 to which the ends of a twin conductor cord 22 may be connected to permit of suitably energizing the heating element 16 when it is desired to operate the appliance.

A removing means for permitting of easily and quickly removing the plug 19 from its operative engagement with the terminal pins 18 comprises a rod 23 that is movably mounted in the plug 19 adjacent to the bottom surface thereof. One end of the rod 23 may extend through a suitable opening 24 provided in the head of the plug 19, and the other end of the rod 23 may move in and be supported by a guide or bearing member 25 that is of substantially U-shape and comprises a relatively narrow strip of metal, the ends of which are secured against the outer surface of the plug 19 by suitable machine screws 26. A collar 27 is provided on the rod 23 intermediate its ends and is of such dimensions and so located that it limits the longitudinal movement of the rod 23, at each end of its travel. An operating knob or handle 28 may also be provided to be engaged by the hand of the operator.

When it is desired to mount the connecting plug 19 on the terminal pins 18, substantially as illustrated in Fig. 1 of the drawing, the operator simply presses the connecting plug home on the pins 18 and as the inner end of the rod 23 operatively engages a plate 29, or if this is not supplied, the outer surface of the side frame 13, it will be moved outwardly until, when the connecting plug is in its proper operative position, the removing member 23 will have been moved outwardly to substantially the position illustrated in Figs. 1 and 2.

If it is desired to remove the connecting plug, the operator need only engage the head of the plug 19 with the fingers, while at the same time pressing against the knob 28 with either the thumb or the palm of the same hand. The pressure of the operator's hand causes the connecting plug 19 to move away from the appliance, while at the same time the circuit is interrupted thereby. This device provides a substantially balanced-pressure means for easily and quickly removing connecting plugs from any light and portable electrically heated appliance, such as are employed on dining room tables, as substantially all of the parts of such devices are heated during the operation thereof, it is substantially impossible to grasp an integral portion thereof with one hand, while the connecting plug is pulled away with the other hand.

This balanced pressure means and method of removing connecting plugs from such appliances effects a disengagement of the plug without tending to move the appliance or apparatus relatively of a supporting surface.

Various modifications and changes may be made without departing from the spirit and scope of the invention, and I desire, therefore, that only such limitations shall be placed thereon as are imposed by the prior art or are set forth in the appended claims.

I claim as my invention:

1. A removable connecting plug for an electrically heated device, comprising a casing, and a manually-operable rod on said casing for effecting disengagement of said plug from said device.

2. A removable connecting plug for an electrically heated device, comprising a casing, and a rod movably mounted on said casing and actuable by an operator to disengage the plug from said device.

3. A removable connecting plug for an electrically heated device, comprising a casing, and a rod movably mounted on said casing and actuable by an operator longitudinally of said casing and against said device to disengage said plug therefrom.

4. A removable connecting plug for an electrically heated device, comprising a casing, and a manually operable balanced-pressure means mounted on said casing for effecting disengagement of said plug from said device.

In testimony whereof, I have hereunto subscribed my name this 20th day of October, 1923.

FRANK THORNTON, Jr.